Oct. 22, 1929.　　W. M. DANN ET AL　　1,732,742
TRANSFORMER TAP CHANGER
Filed April 12, 1926　　13 Sheets-Sheet 1

WITNESSES:
Wm. C. Groome.
Lester J. Budlong.

INVENTORS.
Walter M. Dann, Charles L. Knotts,
Arthur W. Thompson & Leland H. Hill.
BY
Wesley G. Carr
ATTORNEY Oct. 22, 1929.  W. M. DANN ET AL  1,732,742
TRANSFORMER TAP CHANGER
Filed April 12, 1926    13 Sheets-Sheet 3

WITNESSES:

INVENTORS.
Walter M. Dann, Charles L. Knotts,
Arthur W. Thompson & Leland H. Hill.
BY
ATTORNEY Oct. 22, 1929. W. M. DANN ET AL 1,732,742
TRANSFORMER TAP CHANGER
Filed April 12, 1926 13 Sheets-Sheet 4

WITNESSES:

INVENTORS.
Walter M. Dann, Charles L. Knotts,
Arthur W. Thompson & Leland H. Hill.
BY
ATTORNEY Oct. 22, 1929.   W. M. DANN ET AL   1,732,742
TRANSFORMER TAP CHANGER
Filed April 12, 1926   13 Sheets-Sheet 6

WITNESSES:

INVENTORS.
Walter M.Dann, Charles L.Knotts,
Arthur W.Thompson & Leland H.Hill.
BY
ATTORNEY Patented Oct. 22, 1929

1,732,742

UNITED STATES PATENT OFFICE

WALTER M. DANN, CHARLES L. KNOTTS, ARTHUR W. THOMPSON, AND LELAND H. HILL, OF SHARON, PENNSYLVANIA, ASSIGNORS TO WESTINGHOUSE ELECTRIC & MANUFACTURING COMPANY, A CORPORATION OF PENNSYLVANIA

TRANSFORMER TAP CHANGER

Application filed April 12, 1926. Serial No. 101,246.

Our invention relates to electrical transformers and particularly to apparatus for changing the taps of transformers while under load.

One object of our invention is to provide a tap-changing system for operating transformers to raise or lower their primary or secondary voltages without interrupting their electrical output.

Another object of our invention is to provide an electrical transformer in which the tap-changing switches are mounted within the transformer tank and the actuating and controlling mechanism therefor is mounted on the exterior of the tank.

Another object of our invention is to provide a tap-changing system that shall be capable of either manual or mechanical power actuation.

Another object of our invention is to provide means whereby a tap-changing system that is capable of both manual and mechanical actuation, may be selectively connected for either manual actuation or to the mechanical source of power.

Another object of our invention is to provide a tap-changing system characterized by having a main driving shaft that makes one revolution for each complete change in the connections of the transformer, together with the provision of suitable mechanical and electrical interlocks for bringing the device to rest at the end of each revolution of the main driving shaft.

A further object of our invention is to provide suitable mechanical and electrical details for securing the foregoing objects of our invention, which details will be more fully set forth in the accompanying details of the apparatus.

In the accompanying drawings.

Figure 12:
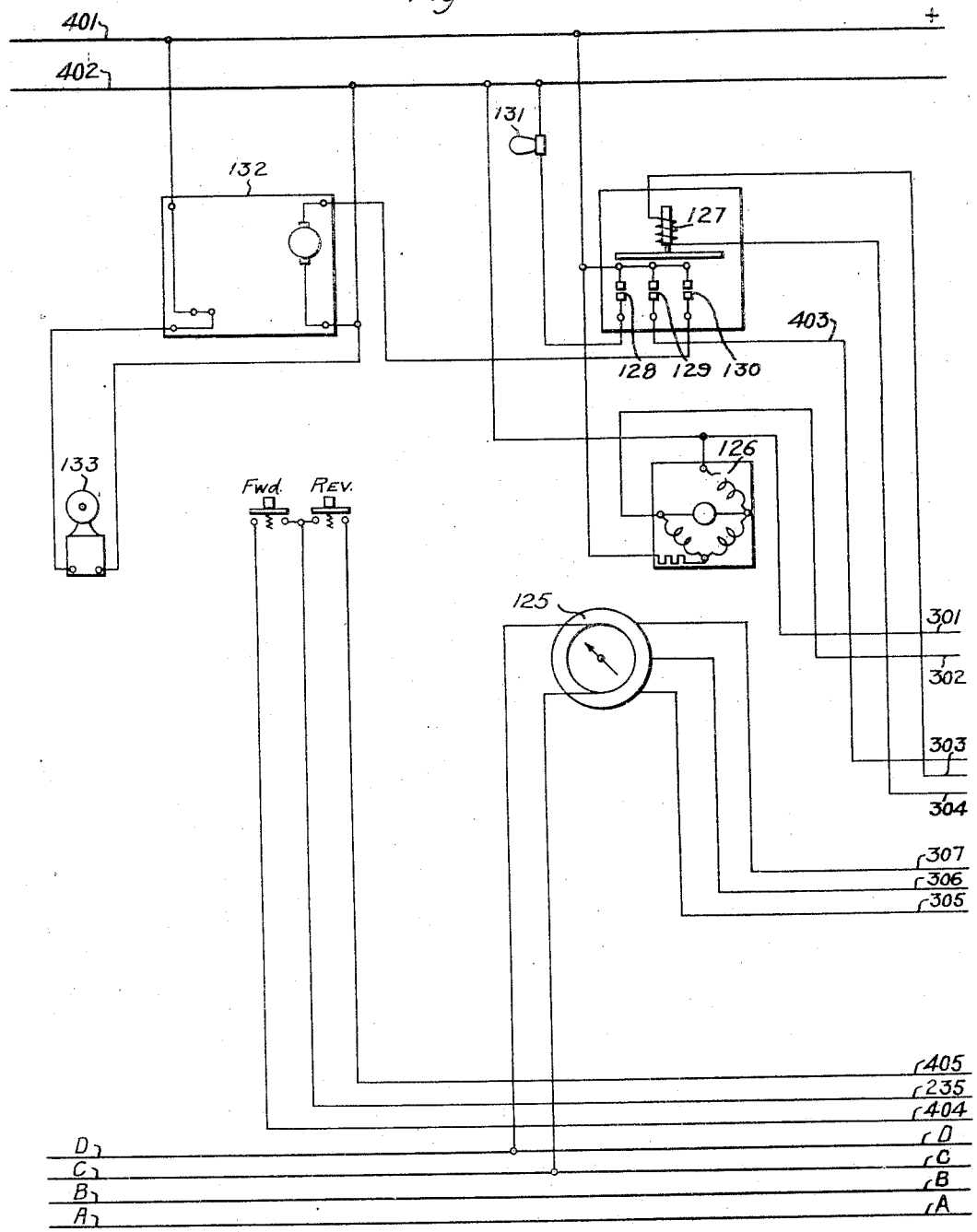
Figure 13:
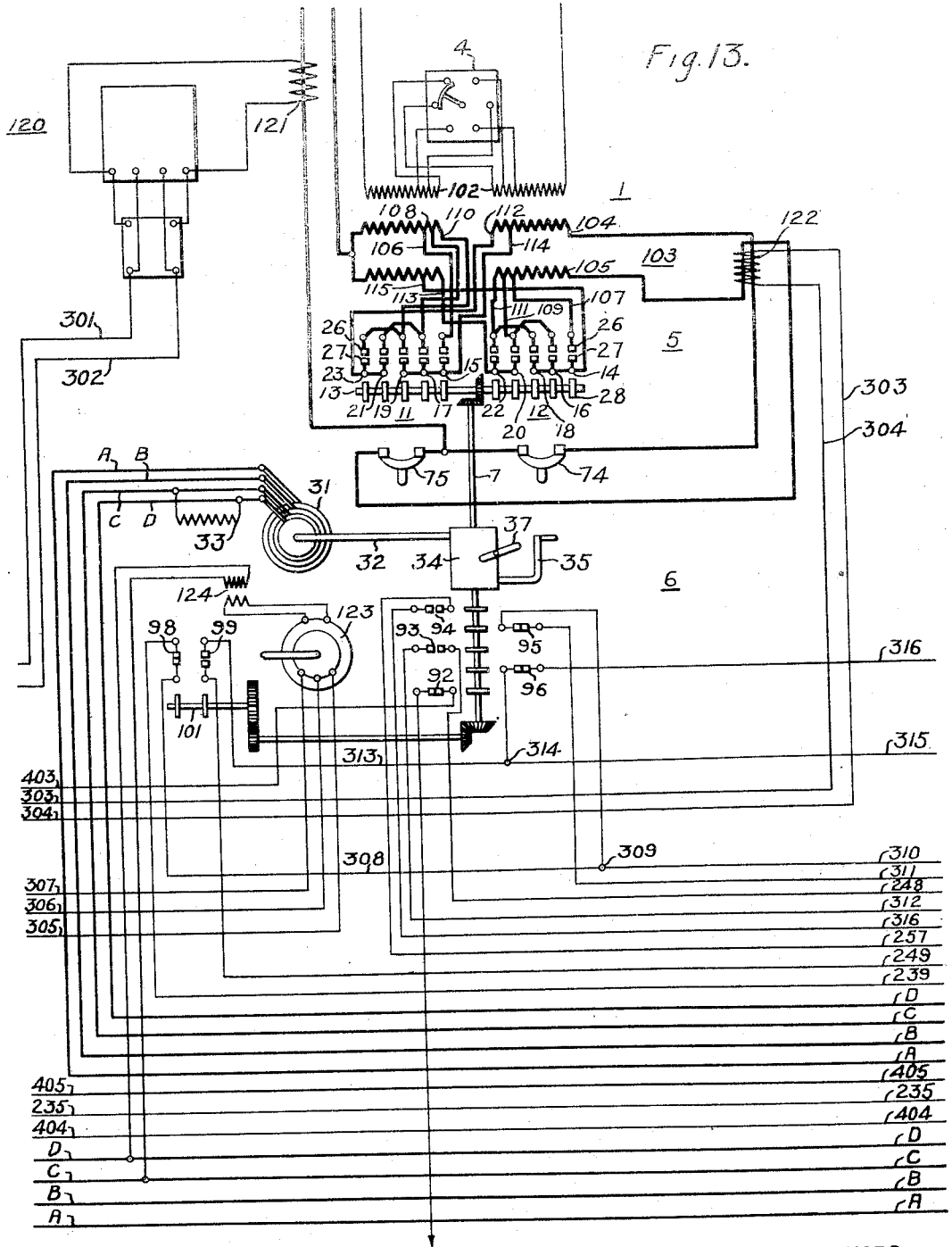
Figure 14:
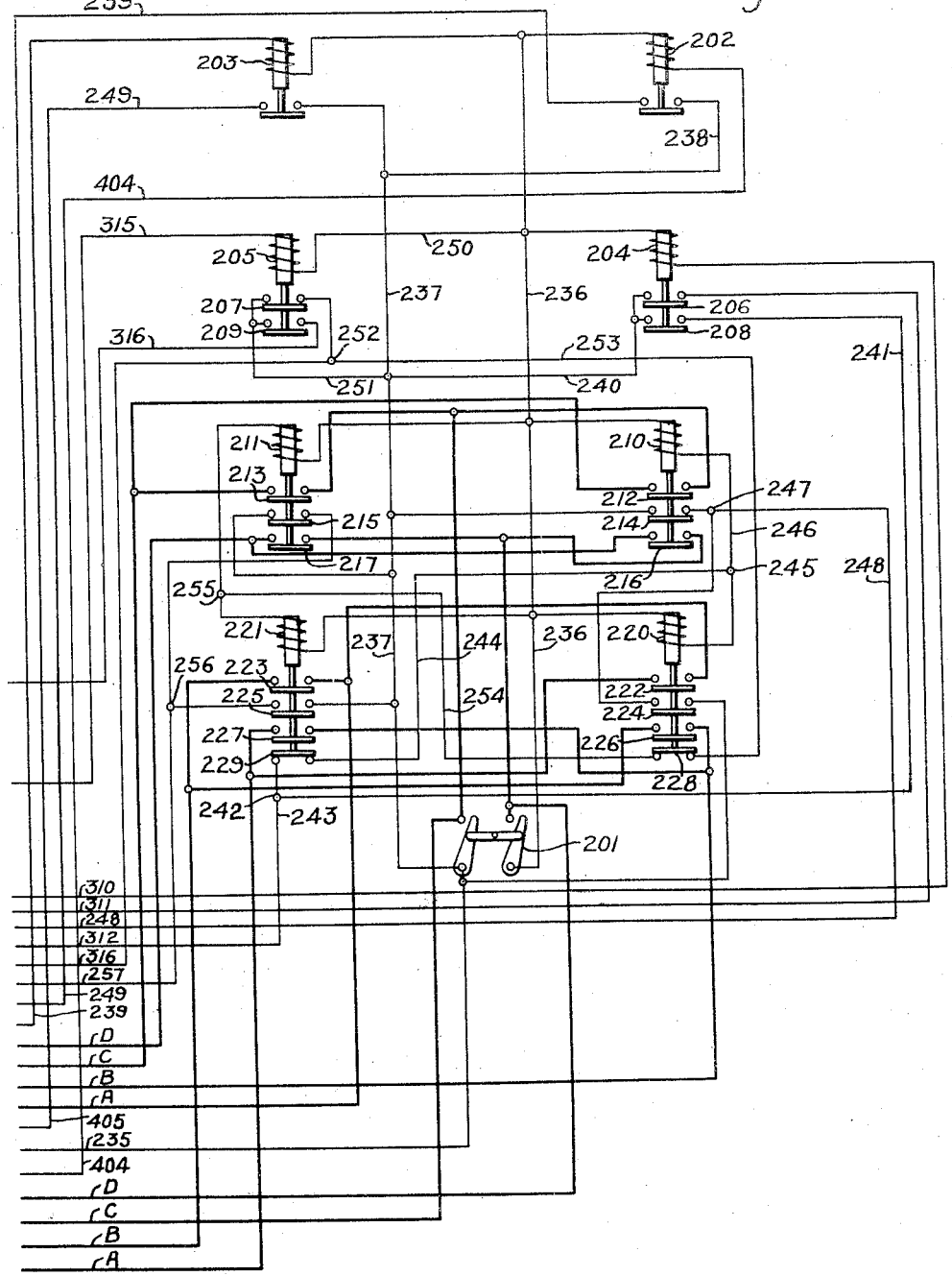

Figs. 12, 13 and 14 collectively, comprise a detailed wiring diagram for the single phase operation of the tap-changing system. Fig. 12 shows the details of the operator's panel; Fig. 13, the electrical connections to actuating apparatus and the details of transformer connections, and Fig. 14 shows the operating relays.

Figure 1:
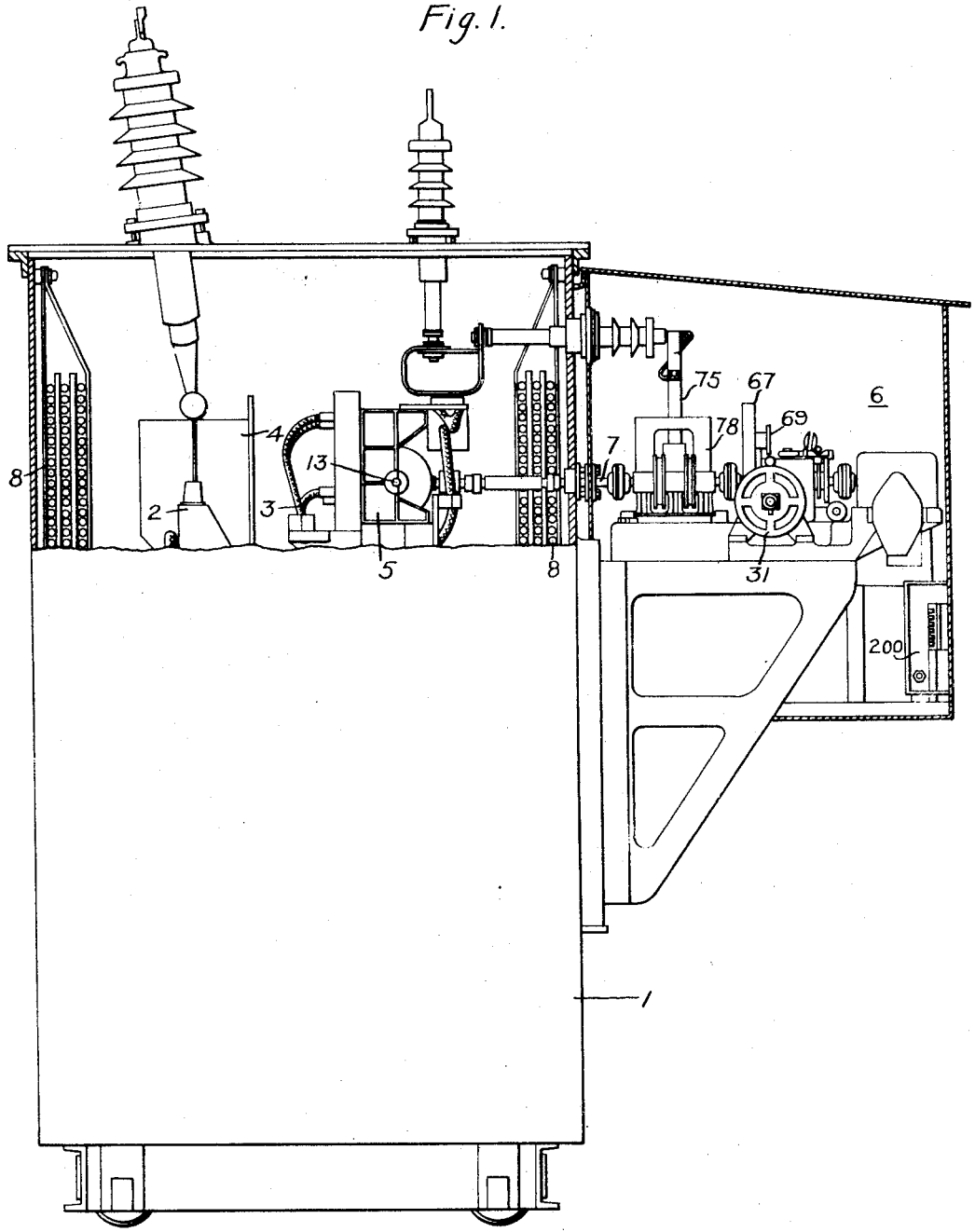
Fig. 1 is a view, partially in elevation and partially in section, of a transformer provided with our tap-changing device.
Figure 2:
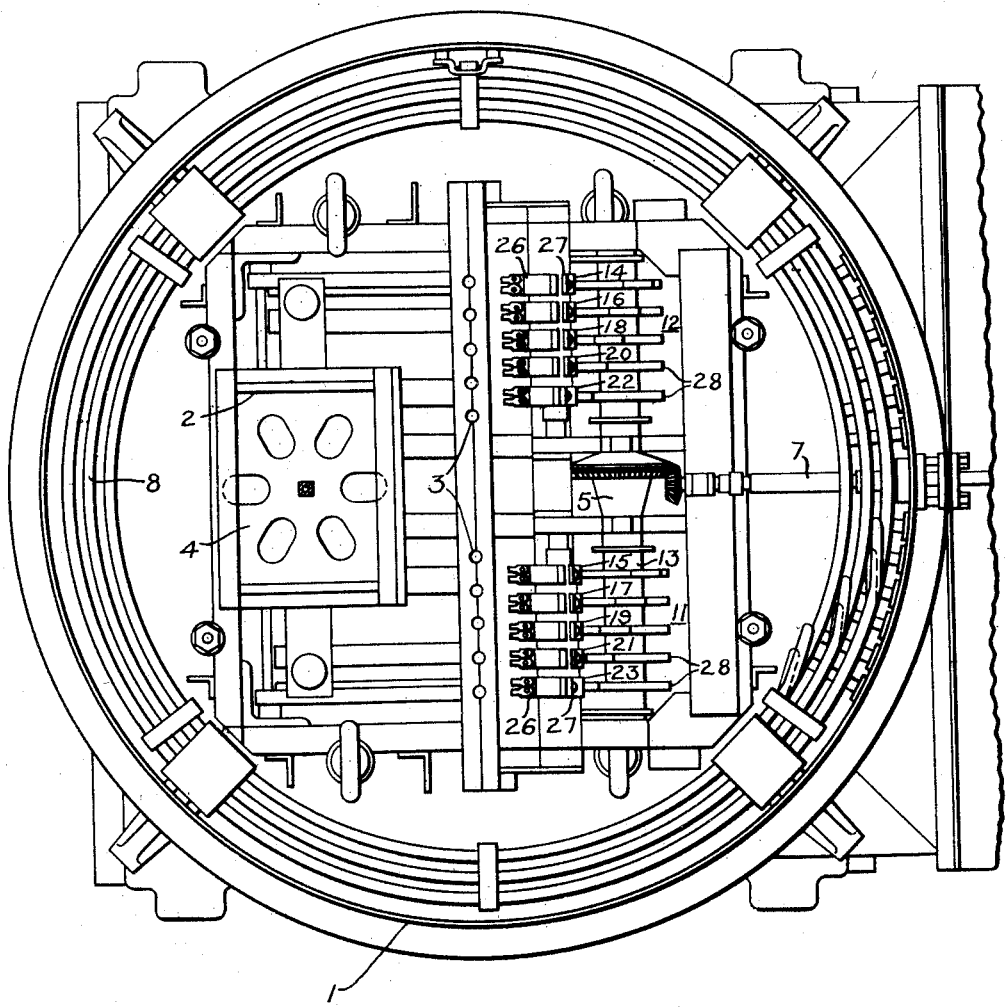
Fig. 2 is a plan view of the transformer tank shown in Fig. 1.

Referring particularly to Figs. 1 and 2, our invention comprises, in general, a transformer 1 that is provided with the usual high tension windings 2 and low tension windings 3 that terminate in tap-changing devices 4 and 5, respectively, together with a manually or motor-driven actuating mechanism 6 for the low tension tap-changer 5 that is structurally mounted on the external face of the transformer and is connected to the tap-changing device 5 by a main drive shaft 7 that passes through the wall of the tank 1.

The high tension tap-changer 4 may be of any preferred type and is shown as of a manually operated type. Suitable cooling coils 8 are disposed within the transformer above the windings and externally of the tap-changing device.

Referring particularly to Figs. 2 and 13 the low tension tap changer 5 comprises two groups of contactors 11 and 12 that are controlled by a common cam shaft 13. Each of the groups 11 and 12 comprises five contactors 15, 17, 19, 21 and 23 and 14, 16, 18, 20 and 22, respectively. Each of the separate contactors comprises a stationary contact member 26 and a movable contact member 27 that is normally biased to its open position.

The several cams 28 on the shaft 13 for operating the contactors of the groups 11 and 12 are so shaped that only one of the contactors 15 to 23 is closed in each group at the same time under normal operating conditions of the transformer 1, but two contactors are simultaneously closed during portions of the tap-changing operations. The gear ratio between the main drive shaft 7 and the contactor shaft 13 is such that upon one complete revolution of the main drive shaft 7 the closed contactor in each group 11 and 12 is opened and its adjacent contactor is closed, thereby completing one step in the regulation of the transformers in a manner to be more particularly pointed out when the electrical connections of the device are set forth. The low tension tap-changer is completely housed within the transformer 1 and is connected to its actuating mechanism 6 only by the shaft 7.

Figure 3:
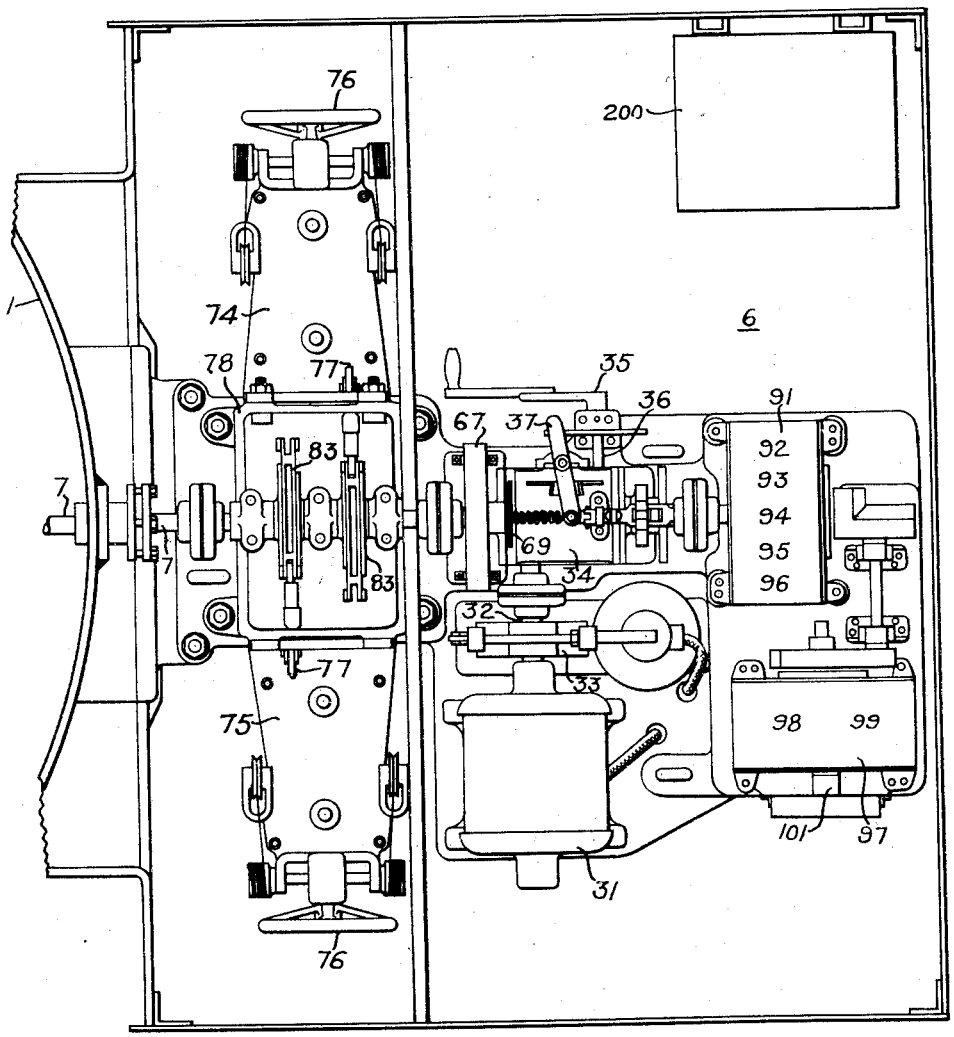
Fig. 3 is a plan view of the externally mounted actuating mechanism for the tap-changing mechanism shown in Fig. 1.

Referring particularly to Figs. 1 and 3, the actuating mechanism 6 is actuated by an electric motor 31, whose shaft 32 extends through a magnetic braking mechanism 33 into a clutch mechanism 34 that is directly mounted on the shaft 7 and drives the latter. In addition, a hand wheel 35 is connected by a shaft 36 to the clutch mechanism 34. A hand lever 37 is provided for causing the clutch mechanism 34 to selectively connect either the shaft 32 or 36 to the shaft 7. The handle 37 is provided with holes 38 that cooperate with holes 39 mounted on the clutch 34 to permit pad-locking the handle in the desired position.

Figure 7:
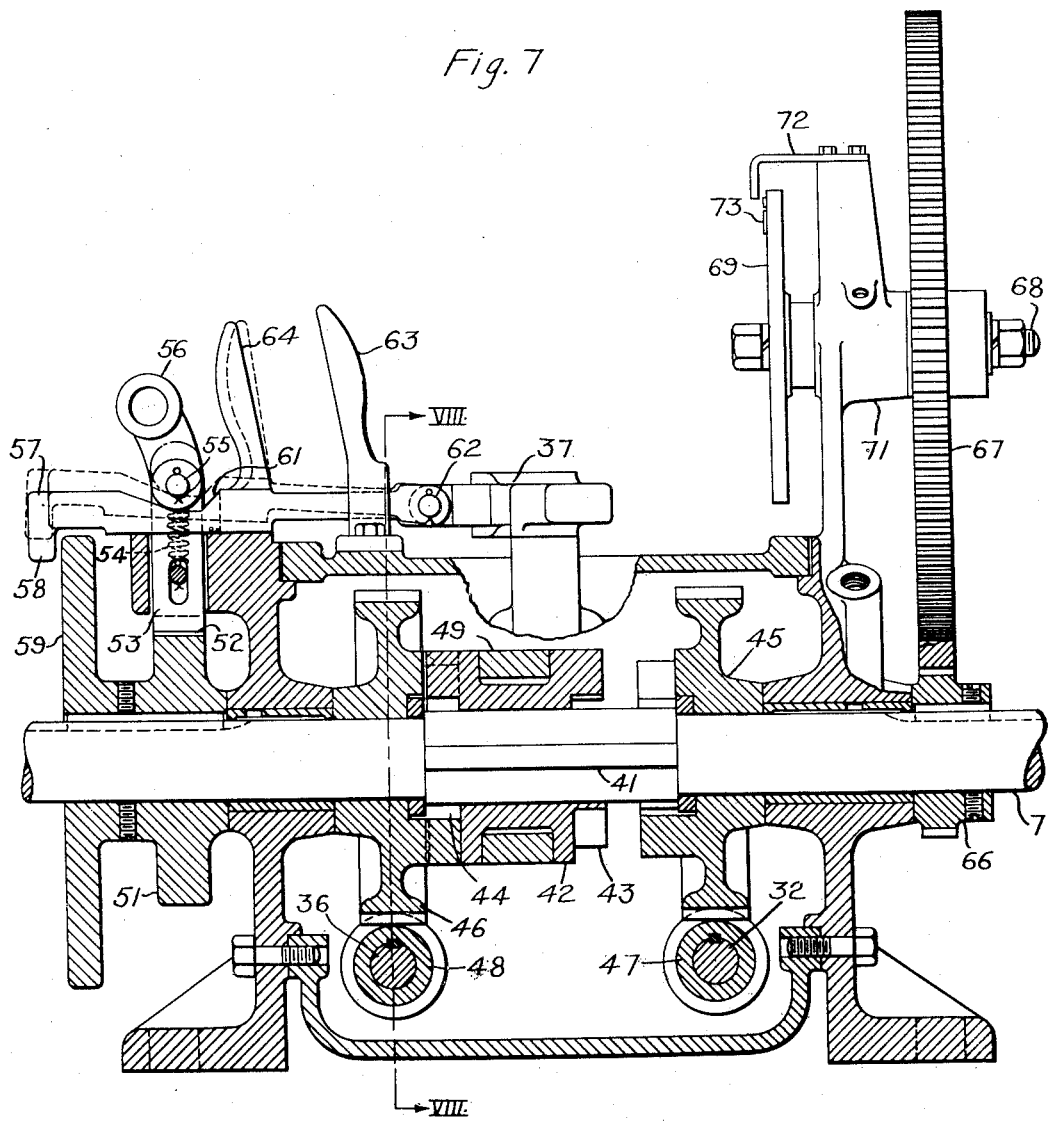
Fig. 7 is a longitudinal cross-sectional view of the structure shown in Fig. 6
Figure 8:
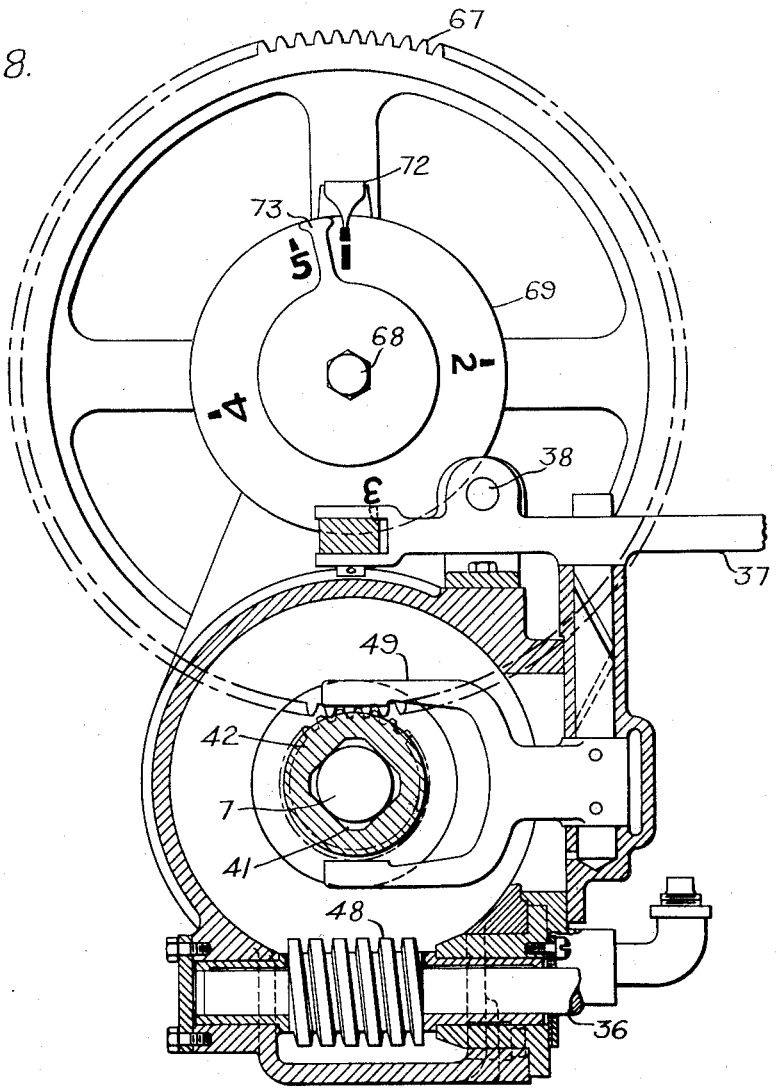
Fig. 8 is a transverse sectional view of the clutch mechanism taken along the section line VIII—VIII of Fig. 7.
Figure 9:
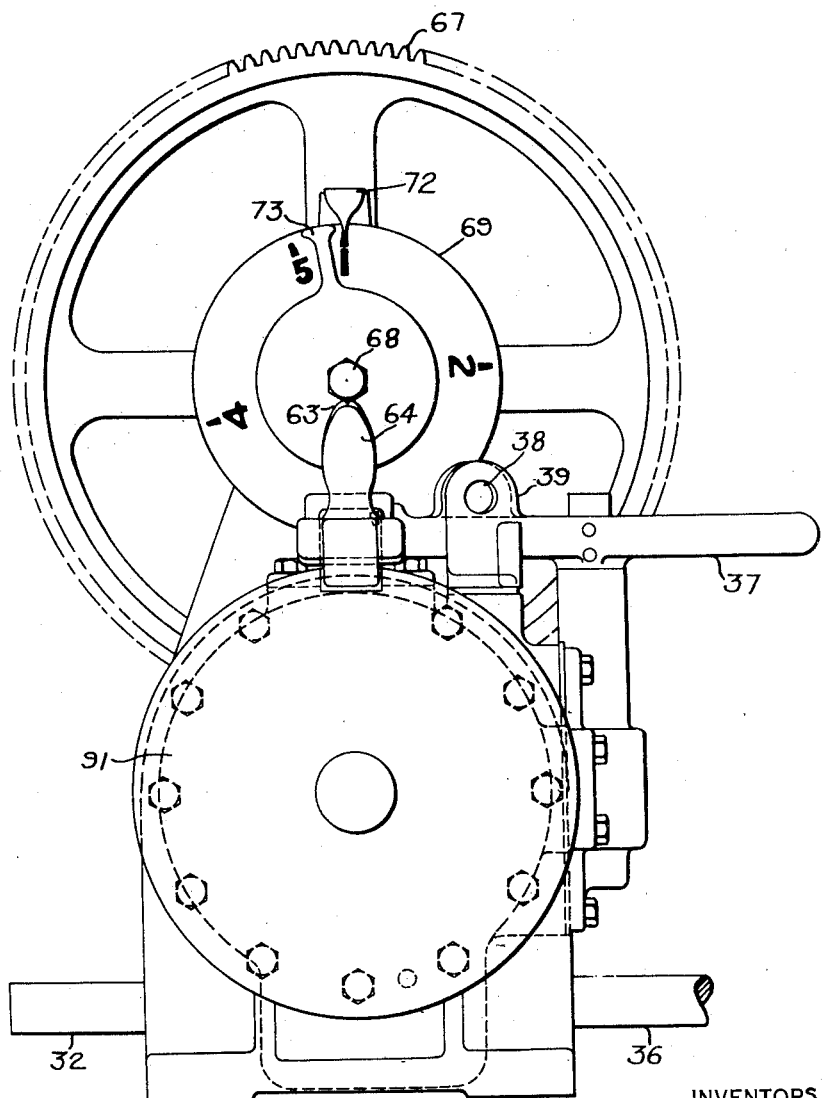
Fig. 9 is an end view in elevation of the clutch mechanism.

Referring particularly to Figs. 7, 8 and 9, the clutch mechanism 34 comprises a square portion 41 of the shaft 7 on which is slidably mounted a double-face gear 42 having teeth 43 and 44 for engaging pinions 45 and 46 that are loosely mounted on the shaft 7 and are driven by worm gears 47 and 48 that are mounted on the shafts 32 and 36, respectively. By manipulating the handle 37, a yoke 49 slides the gear 42 to the left or right, as the case may be, whereupon it engages pinion 45 or 46. After such engagement is made, the proper shaft 32 or 36 is turned and motion is transmitted to the gear 42 which turns the shaft 7. The direction of rotation of the shafts 32 and 36 may be reversed, if desired.

When the shaft 7 is driven through the motor-actuated shaft 32, a suitable system of electrical interlock, hereinafter described, serves to stop the motor at the end of each revolution of the shaft 7. However, for stopping the shaft 7 at the end of each revolution when it is operated by the hand wheel 35, there is provided a stop wheel 51 that has a single notch 52 in its periphery. The notch 52 is adapted to be engaged by a lug 53 that is downwardly biased by a spring 54. The upper end of the lug 53 is provided with a pin 55 about which is mounted a manually-operable cam 56. A bar 57 extends through the lug 53 beneath the pin 55 and terminates in a downwardly-projecting portion 58 that engages a flange 59 carried by the stop wheel 51. The bar 57 is provided with a notch 61 in which the pin 55 rests when the device is manually driven. The other end of the bar 57 is pivotally attached to the lever 37 as at 62. A hand rest 63 is mounted on the clutch housing 34 and cooperates with a hand rest 64 that is mounted on the bar 57.

When the clutch 34 is in position for manual operation, the handle 37 moves the bar 57 to the left of Fig. 7 and the downwardly-projecting portion 58 engages the far face of the flange 59. At the same time the pin 55 drops into the notch 61 and permits the lug 53 to ride on the periphery of the stop wheel 51 until it can drop into the notch 52. Accordingly, at the end of each revolution of the shaft 7, the stop wheel 51 prevents further rotation of the drive shaft 7 until the lug 53 is manually removed from the notch 52.

The lug 53 may be removed from the notch 52 by manipulation of the cam 56, in which case the surface of the cam bears against the faces of the notch 61 and raises the pin 55 a sufficient distance to cause the lug 53 to clear the notch 52. The lug 53 will remain in its upper position so long as the cam remains in its upper or lifting position.

For momentary release of the stop wheel 51, the operator grasps both hand rests 63 and 64 and compresses them, which causes the entire bar 57 to turn about the pivot point 62 and raise the lug 53. By reason of the stop mechanism just described, it is essential that the operator shall have one hand on the hand rests 63 and 64, or the cam 56 be raised, at the end of each revolution of the driving shaft 7 when that shaft is being driven by the hand wheel 35.

Figure 6:
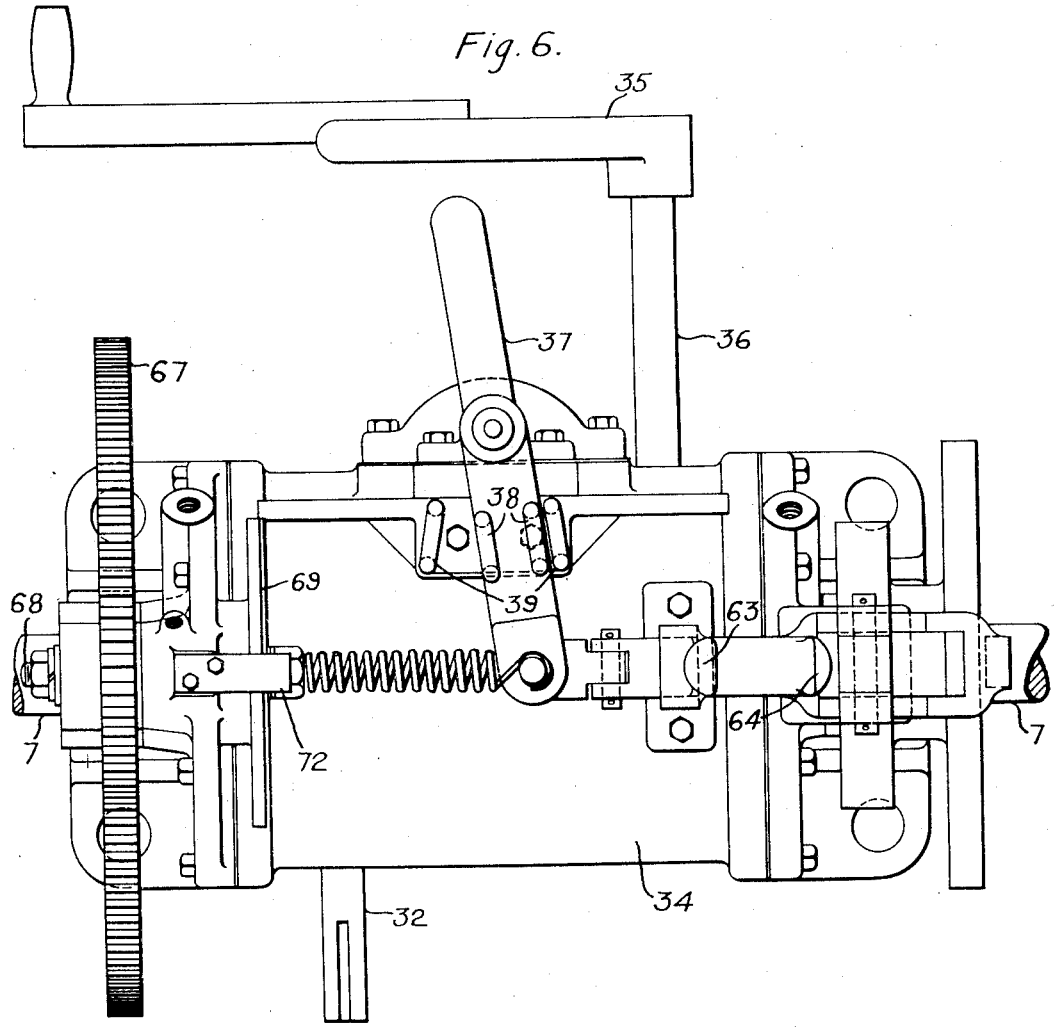
Fig. 6 is a plan view of the clutch mechanism for selectively connecting the manually operable or the mechanical actuating means to the main drive shaft.

When it is desired to shift the gear 42 to engage the gear 45, it is necessary that the operator grasp the hand rests 63 and 64 in order to enable the downwardly-projecting lug 58 to clear the flange 59. The handle 37 is then moved to the right, as viewed in Fig. 6, which movement shifts the gear 42 to the right of Fig. 7 along the square portion 41 of the shaft. At the same time, the bar 57 moves bodily to the right of Fig. 7 and the pin 55 moves out of the notch 61 and rides on the normal surface of the bar 57, thereby lifting the lug 53 out of the notch 52. By this arrangement, the stop wheel is free to turn with every revolution of the shaft 7.

Attached to the shaft 7 at one side of the clutch 34 is a gear wheel 66 that drives a gear 67 mounted on a shaft 68 that has rigidly secured thereto an indicating wheel 69. A journal 71 for the shaft 68 is mounted on the housing of the clutch mechanism 34 and carries a pointer 72 that cooperates with suitable indicia on the face of the indicating wheel 69 and a stop 73 that prevents overtravel of the tap-changing device. The indicia on the indicating wheel are numbered from 1 to 5 to correspond with the five sets of contacting switches in the switch group 11 and 12 so that the movement of the indicating wheel is in synchronism with the movement of contactors 15 to 23.

Between the transformer tank 1 and the actuating mechanism 6 a pair of circuit interrupters 74 and 75 are diametrically disposed relative to the shaft 7. The circuit interrupters 74 and 75 may be of any preferred type having hand wheels 76 for raising and lowering their tanks and operating mechanisms for opening and closing the contact members. Since these details of the circuit interrupter form no part of the present invention, except in so far as they are necessary to complete the combinations shown and described in the specification, the detailed construction thereof is omitted, except that a linkage mechanism 77 is schematically shown as extending to the circuit interrupters.

Figure 4:
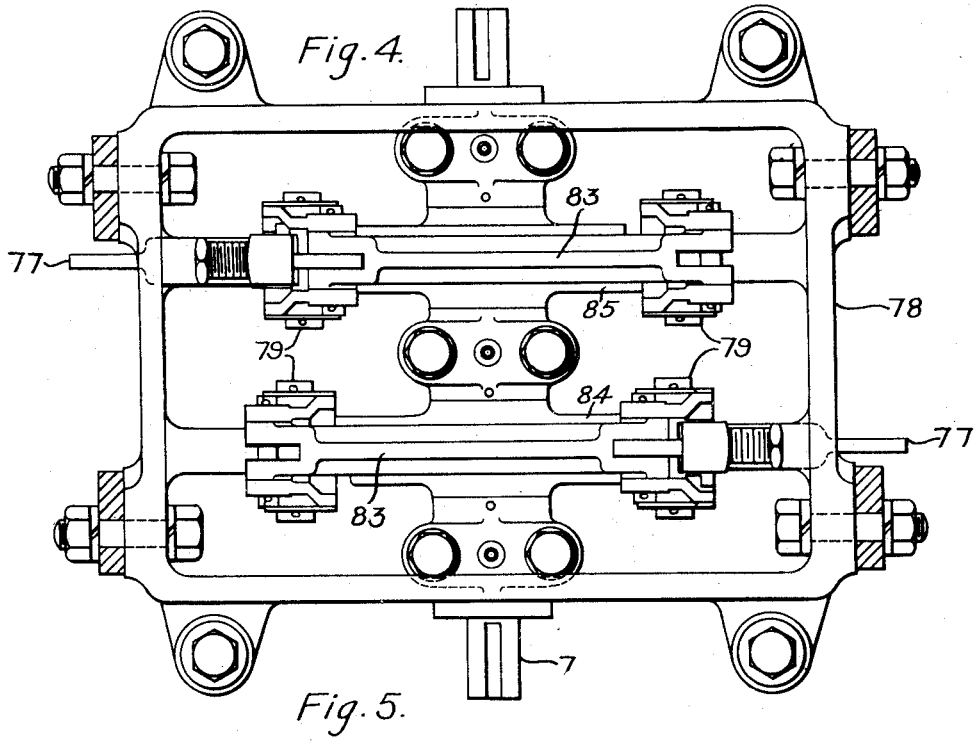
Fig. 4 is a plan view of a portion of the main driving shaft and the circuit interrupter actuating mechanism attached thereto.
Figure 5:
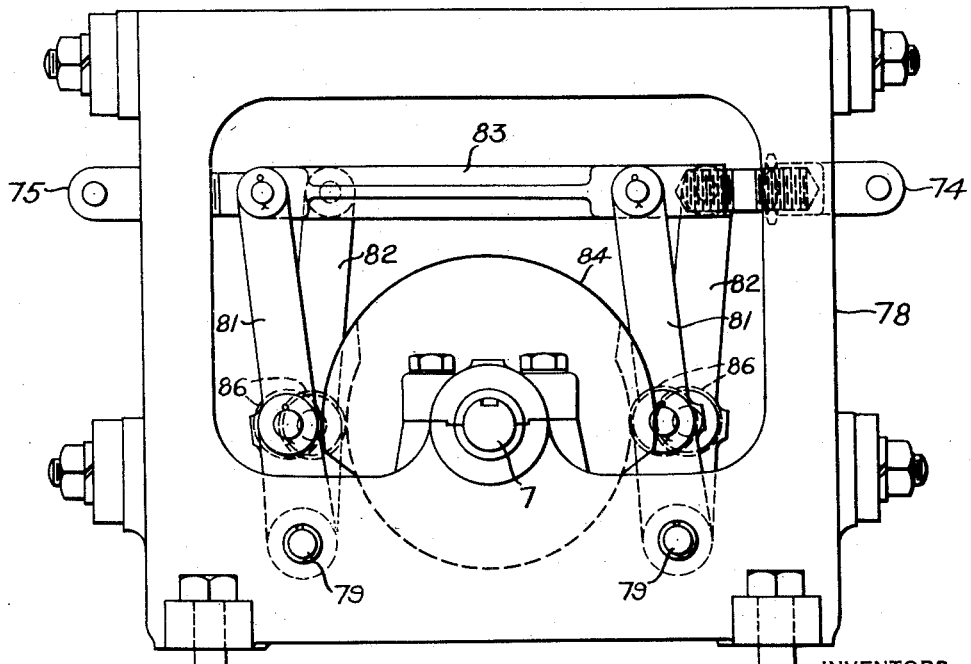
Fig. 5 is an end view of the structure shown in Fig. 4.

Referring to Figs. 3, 4 and 5, the link mechanisms 77 of the circuit interrupters 74 and 75 are connected to the shaft 7 by a housing 78 through which the shaft 7 extends. Within the housing there are disposed four pintles 79, each of which supports a pair of upstanding links 81 and 82. Across the top of each pair of links 81 and 82 there is pivotally carried a bar 83, to each of which there is attached link mechanisms 77. Opposite each pair of links 81 and 82 there is mounted on the shaft 7 a pair of cams 84 and 85, the faces of which bear against rollers 86 carried by the pairs of links 81 and 82.

The surfaces of the cams 84 and 85 are so shaped that as the shaft 7 turns in either direction, the rollers are successively engaged by the portions of the cams 84 and 85 having different radii. Two cams 84 and 85 are provided for each cross bar 83 in order that it may be positively pushed in the one or the other direction when the portions of the cams of the smaller radii are opposite the rollers 86. When the link mechanism 77 of the circuit interrupter 74 is moved by the cross bar 83 to the right, as viewed in the several figures, that circuit interrupter opens under the force of gravity, and when the cross bar 83 is moved to the left, it closes the circuit interrupter 74. If, however, the circuit interrupter does not open under the force of gravity the cooperating cam positively forces it open. When the cross bar 83 connected to the circuit interrupter 75 moves to the left of the several figures, circuit interrupter 75 is opened and when it moves to the right of the several figures, the circuit interrupter 75 is closed.

As the two pairs of cams 84 and 85 are similar and similarly mounted on the shaft 7, it is obvious that, by reason of the opposite direction of movement of the two cross bars 83, one circuit interrupter will always be closed when the other circuit interrupter is open. The contours of the cams 84 are so designed that the closing periods of the circuit interrupters slightly overlap. The circuit interrupters 74 and 75 are provided to interrupt the current traversing the contactors 15 to 23 inclusive in order to prevent arcing within the transformer 1.

Referring particularly to Figures 3, 9 and 13, the shaft 7 extends outwardly from the clutch 34 through a housing 91 for a plurality of stop switches 92, 93, 94, 95 and 96. These several switches control the motor 31 and its magnetic brake 32 to cause it to come to rest at the end of every revolution of the shaft 7, in a manner comparable to the function of the stop wheel 51 when the device is manually operated.

Switches 95 and 96 are normally closed when the transformer is normally operating. Switch 92 is normally closed as it forms a portion of the relay circuits to be hereinafter described. Switches 93 and 94 are normally opened when the transformer is under normal conditions of operation but closed while the taps are being changed at which time the switches 95 and 96 are opened. Switches 95 and 93 cooperate to control the forward movement of the motor while switches 96 and 94 control the reverse direction of rotation of the shaft 7.

A second housing 97 encloses forward and reverse limit switches 98 and 99, respectively, that are controlled by a shaft 101 that is geared down to a ratio of 1 to 5 with respect to the shaft 7. Accordingly, the limit switches 98 and 99 come to play only when the tap-changing device 5 is in one of its extreme positions.

Figure 10:
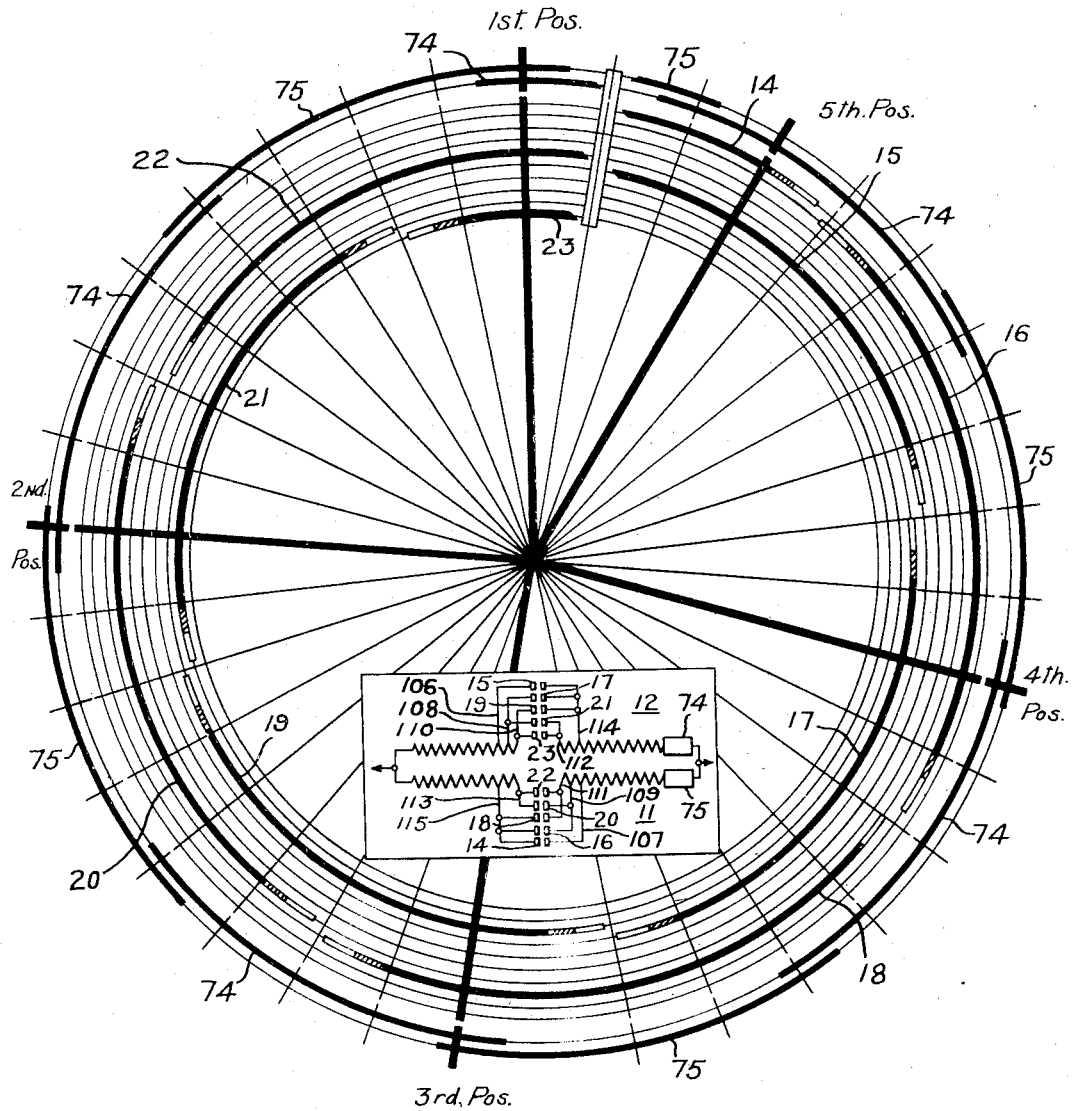
Fig. 10 is a sequence chart showing the successive connections of the low tension winding of the transformer and the controlling circuit interrupter.

Referring particularly to Figures 10 and 13, the transformer 1 comprises a two-part high tension winding 102 and a secondary winding 103 that comprises two windings 104 and 105 that normally operate in parallel circuit to deliver electrical energy to a secondary circuit. The winding 104 is connected in circuit with the circuit interrupter 74 and the winding 105 is connected in circuit with the circuit interrupter 75 so that the opening movement of either circuit interrupter causes the entire load of the transformer to be carried by the other transformer winding for a period of time sufficient to allow the shaft 7 to revolve far enough to conclude a tap change. The winding 104 has a number of tap connections 106, 108, 110, 112 and 114 that are connected to contact switches 15 to 23, inclusive. The winding 105 is provided with tap connections 107, 109, 111, 113 and 115 that are connected to contactor switches 14 to 22, respectively.

The winding 104 is provided with taps 106, 108, 110, 112 and 114 which respectively correspond to taps 107, 109, 111, 113 and 115 of the winding 105.

The percentage of turns of the windings 104 and 105 between the various pairs of taps are stated below:

| | |
|---|---|
| 107 to 109 | 2½% |
| 106 to 108 | |
| 109 to 111 | 2½% |
| 108 to 110 | |
| 111 to 113 | 0% |
| 110 to 112 | |
| 109 to 113 | 2½% |
| 108 to 112 | |
| 113 to 115 | 5% |
| 112 to 114 | |

It will thus be seen that by making the five groups of connections shown above, it is possible to get a total change in voltage ratio of 10% of the transformer winding.

Referring particularly to Figs. 2 and 13, it will be observed that the contactors of groups 11 and 12 are similarly controlled by the shaft 13 with respect to the desired change to be made in the transformer winding, that is, contactors 14 and 15 correspond to each other and are mounted on the right of their respective groups, while contactors 22 and 23 correspond to each other and are mounted on the left of their respective groups. Accordingly, regardless of the direction of rotation of the shaft 13, the circuit closing contactors of the groups 11 and 12 progress in the same direction along the shaft 13.

For convenience, the right-hand contactors 14 and 15 of the groups have been selected to control the connection giving the lowest voltage ratio for the transformer winding 5 while the switches 22 and 23 have been selected to give the highest voltage ratio for the transformer winding 5. The intermediate connections between these two extreme positions are shown in detail in Figures 10 and 13. Accordingly, consecutive operation of the contactors from right to left along the shaft 13 tends to raise the secondary voltage of the transformer and a similar movement from left to right tends to lower the secondary voltage of the transformer. As has previously been stated in connection with the description of the main drive shaft 7 and its actuating mechanism 6, one revolution of the driving shaft 7 causes the successive closing and opening of a pair of adjacent contactors in each of the groups 11 and 12 whereby the transformer ratio is changed by one step.

Referring particularly to Fig. 10, there is shown a system of concentric circles that are divided by heavy radial lines into five major divisions corresponding to the five normal operating positions of the mechanism for controlling the secondary winding of the transformer. At the top of the view, there is a bar indicating the beginning and the end of the cycle of operations. Accordingly, the arc between each of the heavy lines represents one rotation of the main driving shaft 7. The heavy arcs segments of the several circles respectively represent the periods that the several contactor switches 14 to 23 and the circuit interrupters 74 and 75 are in and out of engagement. The shaded end portions of the heavy arc segments represent the periods when the contactors are moving into and out of engagement with each other. By comparing the small schematic wiring diagram forming part of the sequence chart with the indicia on the circles of the chart, it is possible to determine the position of the several contactors and circuit interrupters at any time.

Figure 11:
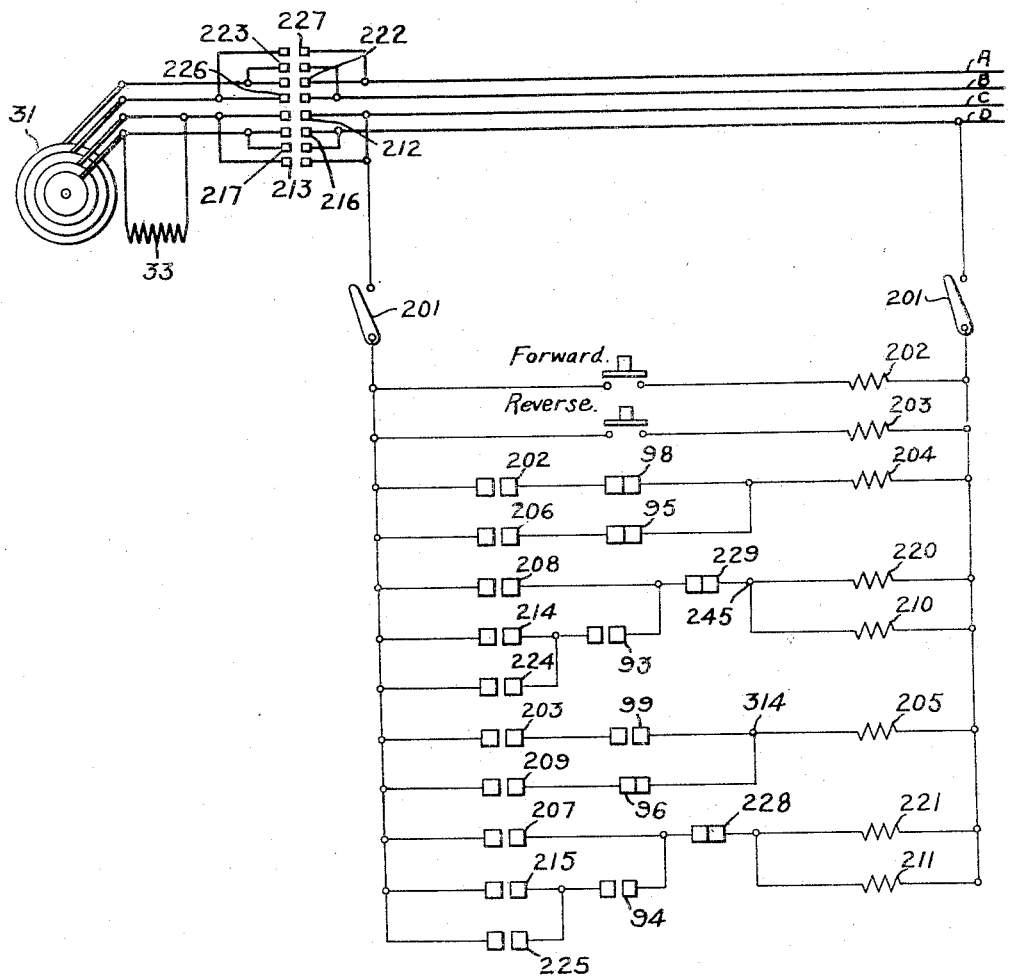
Fig. 11 is a diagrammatic wiring diagram of the transformer tap-changing system for single phase operation.

Referring particularly to Figures 11 to 13 inclusive, there is shown the circuit connections for a single phase transformer embodying our invention. The circuit diagrams for a single phase and for a three phase system are described and claimed in the copending application of W. M. Dann, L. H. Hill, and E. F. Sipher, Serial No. 98,826, filed March 31, 1926, and assigned to the Westinghouse Electric & Manufacturing Company.

Referring particularly to Fig. 14, there are shown a two-pole disconnecting switch 201; a pair of single-pole contactors 202 and 203; a pair of two-pole contactors 204 and 205, the contact elements of which are designated 206 and 208 and 207 and 209, respectively; a pair of three-pole contactors 210 and 211 having contact elements 212 and 214 and 216 and 213, 215 and 217, respectively; and a pair of four-pole contactors 220 and 221 having contact elements 222, 224, 226 and 228 and 223, 225, 227 and 229, respectively. The contacting elements 128 and 129 are back contact elements in that they complete their associated circuits only when their respective contactors 120 and 121 are deenergized. They thereby constitute an electrical interlock that will be more particularly hereinafter described.

The single-pole contactors 202 and 203 initiate the control of the other relays of the panel in the forward or reverse sequence of operation, respectively, by controlling the pick-up relays 204 and 205, respectively. The even numbered elements of the contactors 202, 203, 204, 205, 210, 211, 220 and 221 control the forward movement of the driving shaft 7, while the odd numbered elements control the reverse direction of movement of that shaft. The contactors 210 and 211 and 220 and 221 control the direction of rotation of the two-phase motor 31 by controlling the reversal of the connections of one of the phases.

Referring particularly to Figs. 11 and 14, the forward connections of the motor are controlled by contact members 222, 226, 212 and 216 which are all on the right-hand side of the control panel, as viewed in Fig. 14. The reverse connections of the motor are controlled by the contact members 223, 227, 213 and 217 which are on the left-hand side of the panel, as viewed in Fig. 14. The motor 31 is supplied by a 220 volt, two-phase circuit comprising the circuit conductors A, B, C, and D. The auxiliary apparatus for controlling the motor is connected across the C—D phase, while the reversal of the motor is controlled by reversing the connections across the A—B phase by contact members 222, 223, 226 and 227. The panel shown in Fig. 14 may be mounted at any suitable place, although we have preferably mounted it beneath the housing, as shown at 200, in Fig. 1.

Referring particularly to Fig. 13, the transformer 1 is provided with a hot-spot temperature indicator 120 that is connected by a current transformer 121 to the secondary winding of the transformer. The temperature indicator is connected by conductors 301 and 302 to the operator's panel. A differentially-wound current transformer 122 is connected by conductors 303 and 304 to the operator's panel. There is also provided a transmitting device 123 for conveying signals to the operator's panel through conductors 305, 306 and 307. The transmitting device 123 is energized by a transformer 124 connected directly across the C—D phase of the supply circuit.

Referring particularly to Fig. 12, there is represented the operator's panel which may be located at any convenient point. This panel is associated with the four conductors A, B, C and D for the two-phase alternating circuit and conductors 401 and 402 constituting a direct-current source of supply for certain of the protective auxiliaries of the system. The panel supports two push buttons for initiating forward and reverse movement of the tap changing system and an indicating dial 125 that is connected by the conductors 305, 306 and 307 to the transmitting device 123 located on the transformer 1. The receiving device 125 is energized from the CD phase of the supply circuit. The hot-spot temperature indicator 120 is connected through the conductors 301 and 302 to an indicating dial 126 that is in the form of a Wheatstone bridge. The indicating dial 126 is energized from the direct-current auxiliary circuit. A relay 127 comprising contacts 128, 129 and 130 is controlled from the differentially-wound transformer 122 by the conductors 303 and 304.

The details of the protective relay system are shown and described in the application of Harold W. Smith, filed March 31, 1926, Serial No. 98,703, and assigned to the Westinghouse Electric & Manufacturing Company, and accordingly, the showing of the relay in the present application is largely schematic. The relay 127, when energized by an unbalance between the transformer windings 104 and 105 closes its contact 128 and energizes a signal lamp 131 mounted on the panel board. Through the contact 130 of the relay 127, a time-delay relay 132 is energized to ring an alarm bell 133 or operate any other indicating device on the operator's panel. The contact 129 of the relay 127 is connected by a conductor 403 through the pilot switch 92 to any suitable bell or circuit breaker trip coil (not shown). Since the pilot switch 92 is always open during the periods of tap changing, it is obvious that the connected bell or circuit breaker will not be operated unless an unbalance exists between the two windings 104 and 105 of the transformer at a time when the transformer is in its normal operating position.

Assuming the tap changing system to be at rest and so connected that the transformer is producing its lowest voltage ratio, which is the position where the reverse limit switch 99 is open, the operator presses the forward push button on the operating panel. A circuit is then completed which extends from the disconnecting switch 201 through the conductor 235, forward push button, conductor 404 through the coil of contactor 202 and conductor 236 to disconnecting switch 201. Since the disconnecting switch 201 is connected to the two-phase conductors C—D of the supply circuit, it is not believed necessary to trace the circuits further than to show the origin in and return to, the disconnecting switch 201.

Upon the energization of the contactor 202, a circuit is completed that extends from the disconnecting switch 201 through the conductor 237, conductor 238, contact element of the contactor 202, conductor 239 to forward limit switch 98, conductor 308, terminal 309, conductor 310, coil of contactor 204 and conductor 236 to disconnecting switch 201. This circuit serves to energize the contactor 204, which completes a circuit extending from terminal member 309 through normally-closed pilot switch 95, conductor 311, contactor element 206, conductor 240 and conductor 237 to disconnecting switch 201.

Referring particularly to Fig. 11, it will be noticed that the last two circuits place the contactor element 202 and the limit switch 98 in parallel circuit with the contactor element 206 and the pilot switch 95, both of which circuits are in series connection with the coil of the contactor 204. Were the forward push button manipulated when the tap changer was in such position that the forward limit switch 98 is open, it is obvious that the contactor coil 204 will not be energized, since the circuit through the pilot switch 95 for completing the circuit, is dependent upon the contact element 206 of the contactor 204.

Energization of the contactor 204 completes a circuit from the disconnecting switch 201 through conductor 237, conductor 240, contact element 208, conductor 241, terminal 242, conductor 243, back contact 229 and conductor 244 to terminal 245. From terminal 245, circuit branches, one branch extending through conductor 246, coil of contactor 210 and the conductor 236 to disconnecting switch 201; while the other branch extends from terminal 245 through coil of the contactor 220 and conductor 236 to disconnecting switch 201. Accordingly, the contactors 210 and 220 are in parallel circuit and are simultaneously energized to complete the circuit to the motor 31 through contact members 222, 226, 212 and 216.

In the meantime, the operator may release the forward push button, thereby interrupting the circuit through the contactor 202, which leaves the contactor 204 energized by a circuit that extends from disconnecting switch 201 through conductor 236, contactor 204, conductor 310, terminal 309, pilot switch 95, conductor 311, contactor element 206, conductor 240 and conductor 237 to disconnecting switch 201.

As the motor 31 moves the drive shaft 7, the pilot switch 93 is closed shortly before the pilot switch 95 is opened. The closing of the pilot switch 93 completes a circuit from disconnecting switch 201 through contactor 214 and 224 in parallel circuit, terminal 247, conductor 248, pilot switch 93, conductor 312, terminal 242, back contact 229, conductor 244 to terminal 245 and the coils of the contactors 210 and 220 in parallel circuit to the conductor 236 and thence to the disconnecting switch 201. By tracing this circuit, it will be observed that further energization of the contactors 210 and 220 is independent of the energization of the contactors 202 and 204 and, accordingly, when the pilot switch 95 is opened by the operation of the driving shaft 7, the contactor 204 opens, carrying therewith the contact elements 206 and 208. Accordingly the motor 31 continues to turn until the pilot switch 95 is again closed by the driving shaft 7 and the pilot switch 93 is opened. The opening of the pilot switch 93 interrupts the circuit through the coils of the contactors 210 and 220, permitting them to fall to their open position. The fact that the pilot switch 95 closes before the pilot switch 93 opens does not change the circuits at that time since the contact element 206, which is in series circuit therewith, is already opened.

During the foregoing cycle of electrical operations, the motor 31 has caused the driving shaft 7 to turn the shaft 13 to cause the circuit through the contactors 14 and 15 to be opened and that between the contractors 16 and 17 to be closed, thereby cutting in the sections of the transformer winding between the conductors or taps 106 and 108, and 107 and 109, thereby raising the transformer ratio by two and one-half percent. The operator may, by sending a new impulse from the forward push button, cause the system to go through the successive forward steps until the fifth or last step is reached, when the forward limit switch 98 is opened, which prevents further energization of the contactors 204, 210 and 220. In the latter position, of course, the reverse limit switch 99 has already closed.

In order to lower the voltage ratio of the transformer, the operator presses the reverse push button on his panel, which completes a circuit from the disconnecting switch 201 through the conductors 235, the reversing push-button, the conductor 405, the coil of the contactor 203 and the conductor 236 to the disconnecting switch 201. A circuit is then completed that extends from the disconnecting switch 201 through the conductor 237, the contact element 203, the conductor 249, the reversing limit switch 99, the conductor 313, the terminal 314, the conductor 315, the coil of the contactor element 205, the conductor 250 and the conductor 236 to the disconnecting switch 201. The completion of this circuit energizes the contactor 205. From the terminal 314 a branch circuit extends through the pilot switch 96, a conductor 316, the contact element 209, a conductor 251 and the conductor 237 to the disconnecting switch 201.

The energization of the contactor 205 serves to complete a circuit extending from disconnecting switch 201 through conductor 237, conductor 251, contact element 207, terminal 252, conductor 253, back contact 228, conductor 254, terminal 255, the contactor coils 211 and 221 in parallel circuit to conductor 236 and disconnecting switch 201, thereby energizing contactors 211 and 221.

The closing of the contactors 211 and 221 closes their respective contact elements 215 and 225 which completes a circuit extending from the disconnecting switch 201 through conductor 237, contact elements 215 and 225 in parallel circuit to terminal member 256, conductor 257, pilot switch 94, conductor 316, terminal 252, conductor 253, back contact 228, terminal 255 and coils of contactors 211 and 221 in parallel circuit to conductor 236 and disconnecting switch 201.

Upon the completion of the circuits through the contactors 211 and 221, the motor is connected through the contact elements 223, 227, 213 and 217 with phase A—B connected in a reverse sense, whereby the motor 31 is caused to run in a reverse direction. The pilot switch 94 closes before the pilot switch 96 is opened in a manner similar to that of pilot switches 95 and 93 so that the final operation of the motor is controlled through the contact elements 215 and 225 in parallel circuit, pilot switch 94 and back contact 228. Accordingly, upon the final opening of the pilot switch 94, after the pilot switch 96 has been closed, the motor 31 comes to rest under the influence of the magnetic break 33 in a manner similar to the cessation of movement in the forward direction, which operation has already been explained in detail.

Since the back contact element 228 is mounted on contactor 220, which contactor is energized during the forward movement of the motor, for completing the circuit of the contactors 211 and 221, it is impossible to close the latter contactors when the contactor 220 is energized. Similarly it is impossible to close the contactors 210 and 220 when the contactor 221 is energized for the reason that the energization of the contactor 221 opens the back contact 229. The provision of this electrical interlock between the contactor elements 228 and 229 insures that, in the event the operator should simultaneously press the forward and reverse buttons, the motor would not be burnt out by short-circuiting either of the phases A—B and C—D.

Since the forward and reverse limit switches 98 and 99 are both in their closed positions at all the intermediate stages of the operation of the tap changer, it is possible to raise or lower the ratio of the transformer between such intermediate stages by the operation of either the forward or reverse push buttons, as the operator may elect.

If the operator desires to learn the thermal condition of the transformer at any time, he is able to gain that information from the temperature indicator 126. Likewise, he is able to follow the operation of the tap-changing device by means of the remotely disposed indicator 125. Whenever an unbalance exists on the windings of the transformer 1, the operator is warned by means of the light 131. Should an unbalance exist between the transformer windings 104 and 105 while the transformer is connected for normal operation, the bell or circuit interrupter indicated at the bottom of Fig. 12 will be operated to automatically give an alarm or interrupt the entire transformer system. Should an unbalance exist for too long a period of time when the transformer taps are being changed, the time-delay relay 132 will operate the bell 133. A circuit interrupter trip coil may be substituted for the bell 133 if desired.

It will thus be seen that we have devised a transformer tap-changing system that requires but a forward and a reverse button for its manipulation. A main driving shaft is adapted to make one revolution for changing one step of the voltage regulation of the transformer. The shaft is driven by a motor that is controlled by a system of pilot and limit switches so that the driving shaft automatically comes to rest at the end of each revolution or tap change. The main driving shaft may also be manually actuated, in which case a suitable stop wheel is provided for insuring that the main driving shaft shall come to rest after each revolution.

It is to be understood that such changes may be made in the arrangement, disposition and circuit connections of the component parts of the tap-changing system as shall fall within the scope of the appended claims.

We claim as our invention:

1. In a tap-changing system, a main driving shaft, a hand-wheel and a clutch for connecting the hand-wheel to the shaft, said clutch comprising means for limiting the movement of the shaft to one revolution between successive manual manipulations thereof.

2. In a tap-changing system, a main driving shaft, a hand-wheel and a clutch comprising stop means for limiting the movement of the shaft to one revolution between successive manipulations thereof in either direction.

3. In a tap-changing system, a main driving shaft, a hand-wheel and a clutch for connecting the hand-wheel to the shaft, said clutch comprising means requiring the operator to engage the clutch at the beginning of each revolution of the shaft.

4. In a tap-changing system, a shaft operable through a number of revolutions for actuating the tap-changing system, a motor for the shaft and means for stopping the motor after every revolution of the shaft.

5. In a tap-changing system, a shaft operable through a number of revolutions for actuating the tap-changing system, an electric motor for operating the shaft and switches for stopping the motor after each revolution of the shaft.

6. In a tap-changing system, a shaft operable through a number of revolutions for actuating the tap-changing system, a motor for actuating the shaft, a plurality of tap-changing switches, certain of which are selectively actuated upon each revolution of the shaft, and switches for stopping the motor after every revolution of the shaft.

7. In combination, a tap-changing device, an actuating shaft therefor, manual and electrical means for driving the shaft operable through a number of revolutions in either direction of rotation, a clutch for selectively connecting the manual or the electrical means to the shaft, means associated with the clutch for stopping the shaft after every revolution when driven by the manual means and switches for stopping the shaft after every revolution when driven by the electrical means.

8. In combination, a tap-changing device, an actuating shaft therefor, manual and electrical means for driving the shaft operable through a number of revolutions in either direction of rotation, means for selectively connecting the manual and electrical driving means to the shaft, and means associated with the manual and electrical driving means for stopping the shaft after a predetermined amount of angular travel.

9. In a tap-changing system, a plurality of tap-changing switches, actuating means operable through predetermined cycles for operating the tap-changing switches in sequence when moving in a given direction and means for stopping the actuating means at the end of each cycle of operation.

10. In a tap-changing system, a plurality of tap-changing switches, a shaft for operating the tap-changing switches in sequence when turning in a given direction, means for rotating the shaft and means for stopping the shaft at the end of the sequence of operations.

11. In a tap-changing system, a plurality of tap-changing switches, reversible rotating means for actuating the tap-changing switches in sequence in either direction of rotation and means for stopping the rotating means at the end of each switching operation.

12. In a tap-changing system, a plurality of tap-changing switches, reversible rotating means for actuating the tap-changing switches in sequence in either direction of rotation and means for stopping the rotating means at the end of each rotation and at the end of the sequence of operations regardless of the direction of rotation.

13. In a double-acting clutch for a transformer tap-changing system, a plurality of sources of power, a shaft driven thereby, and mechanism for selectively connecting one of the sources of power to the shaft comprising a stop wheel requiring manual release at the end of each revolution of the shaft.

14. In a double-acting clutch for a transformer tap-changing system, a plurality of sources of power, a shaft driven thereby, and mechanism for selectively connecting one of the sources of power to the shaft comprising a stop wheel requiring manual release at the end of each revolution of the shaft, and means for rendering the stop wheel inoperative when the selective mechanism is in its second position.

In testimony whereof, we have hereunto subscribed our names this 2nd day of March, 1926.

WALTER M. DANN.
CHARLES L. KNOTTS.
ARTHUR W. THOMPSON.
LELAND H. HILL.